Figure 1:
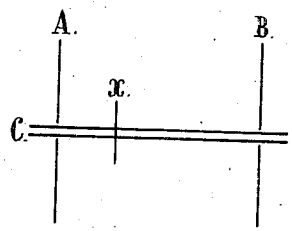

Dec. 31, 1940.   H. BROWDE   2,226,658

METHOD OF SCANNING IMAGES

Filed Dec. 28, 1936

H. Browde
INVENTOR

By: Glascock Downing & Seebold
Attys.

Patented Dec. 31, 1940

2,226,658

UNITED STATES PATENT OFFICE 2,226,658

METHOD FOR SCANNING IMAGES

Hirsh Browde, Leningrad, Union of Soviet Socialist Republics

Application December 28, 1936, Serial No. 117,966. In the Union of Soviet Socialist Republics September 9, 1934

2 Claims. (Cl. 178—7.2)

In the television systems known heretofore the scanning of the image is effectuated by the movement of some material agent, such as Nipkov disc or a cathode-ray beam. The present invention has for its object a new television system in which the scanning of the image at transmitting is effectuated by the movement of a certain line of an electrostatic field.

Let us suppose that there is an electrostatic field formed between two electrodes and that we introduce in this field a third electrode to which is applied a potential having the magnitude intermediate between the potentials of the first two electrodes. In the new electrostatic field thus formed there will always exist on the third electrode's surface a certain line on which the intensity of field will be equal to zero. When varying the potential of one of the electrodes this zero field line will travel along the surface of the third electrode. Thus, for example, if we place a cylindrical electrode at right angles to the plates of a flat condenser in the manner shown in Fig. 1 and apply to the cylindrical electrode C a potential $V_c$ intermediate between the potentials $V_A$ and $V_B$ of the plates A and B, then the intensity of the electric field on the cylindric surface (which intensity is the same along the line of intersection of the cylinder by the plane parallel to the condenser plates), will have different values along the generatrix of the cylinder and will be equal to zero at a distance X from the plate A, at the point where the intensity of the electric field changes its sign. The line of the cylinder section on which the intensity of the field is zero, will displace itself along the generatrix of the cylinder at every variation of potential at least on one of the electrodes. Within a certain range it is always possible to make the length of displacement of said zero line proportional to the magnitude of the change of potential.

Let us consider the processes which take place if the cylindrical cathode is made sensitive to light so that it will represent a photo-cathode onto which a line of picture is being projected. In this case the line of the electrostatic field will represent the boundary between that portion of the photocathode which emits the current and the portion which does not emit the current onto the electrode standing under higher potential, as, for example, the plate A which in this instance serves as the anode of a photocell. The current in the anode circuit of such a photocell will be expressed by the sum of elementary currents in the limits between the beginning of the photocathode and the point X in which the boundary of the emitting portion of the photocathode lies. Let the illumination of the picture line projected on the photocathode represent a certain function $F(x)$ of the distance between the point X and the beginning of the photocathode, and let the sensitivity of the photocathode be S. Then the anode current will be expressed as the integral $$I = \int_0^x S.F(x)dx$$

wherein the upper limit (the coordinate of the boundary point X) is a certain function of the electrode voltages. Assuming that the displacement of the boundary X is proportional to the voltage change of one of the electrodes, for instance, the cathode C (as mentioned above, this condition may be always effectuated within a certain range), we will make the cathode voltage a linear function of time (in practice it may be attained by giving this variable voltage a sawtooth shape) and obtain the coordinate of the boundary point X proportional to time ($x=kt$). By suitably choosing the coordinate of the begining of the photocathode and the magnitude of its initial potential, and also inserting a certain inductance L in the anode circuit, we will obtain across this inductance the voltage $$V_L = L.\frac{dI}{dt} = L.\frac{d}{dt}\int_0^x S.F(x).dx$$

where $x=kt$. Substituting X by its function of $t$ and finding the integral we obtain the voltage across the inductance equal to $V_L = k\ S\ F\ (x)$, where $x=kt$.

Thus it will be seen that in the case as set forth the voltage across the inductance will be in every instant $t$ proportional to the magnitude of illumination in the corresponding element of the image line ($x=kt$), that is in the point where in the given instant passes the zero line of the electrostatic field; in other words we have in this instance a linear scanning of the image line.

Figs. 1, 2, and 4 to 8 are line diagrams of circuits for carrying out the invention.

Figure 3:
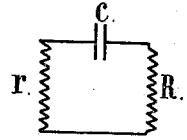
Figure 4:
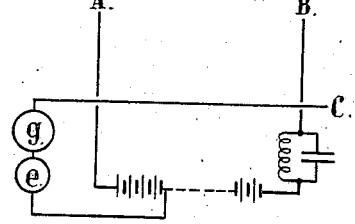
Figure 5:
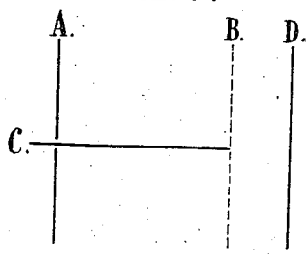
Figure 6:
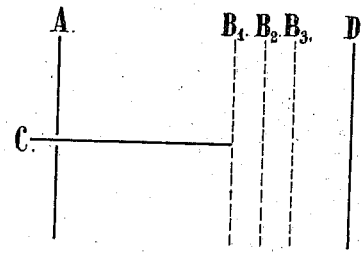

Fig. 3 is a diagram of a circuit for coupling the photo-electric device to an amplifier.

Figure 2:
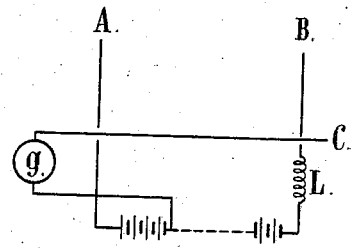

The above described system is diagrammatically shown in Fig. 2. A certain D. C. voltage is applied across the condenser plates A and B. The cathode C receives a certain portion of this D. C. voltage and in the same time an alterating saw-tooth voltage from the generator G. In the circuit of the plate B, which acts as the anode of the photocell, is inserted an inductance L. In the anode circuit of the photocell may be inserted not only an inductance but also a resistance or any combination of resistances which satisfies to the condition that the voltage taken directly across a certain resistance, or the same voltage amplified by a suitable amplifier, is proportional to the differential coefficient of the photocurrent. Thus, for example, intsead of the inductance a small ohmic resistance $r$ may be inserted in the photocurrent circuit and connected in parallel with a combination consisting of a small capacitance C and an ohmic resistance R, as shown in Fig. 3. It is easy to show that the voltage taken across the resistance R will be proportional to the differential coefficient of the photocurrent flowing through the resistance $r$. We may also include in the photocurrent circuit a simple ohmic resistance, but in the amplifier which amplifies the voltage taken from this resistance, we must then insert into one of the amplifying steps a small inductance or the above-mentioned combination of resistances which has been shown in Fig. 3.

The above-described method of detaching from the integral photocurrent the signal reproducing the image of an element of the picture's line, located in the travelling boundary point, which method consists in that in the circuit of said photocurrent is inserted some differentiating means, such as an inductance, a transformer, or some combination of resistances, is not the single possible method. In order to detach the signal of the image of one element from the integral photocurrent we may, for example, proceed also in the following manner. In addition to the saw-tooth voltage which causes the zero line (or the zero point, if the photocathode is infinitely thin) of the electrostatic field to displace itself along the photocathode in a linear function, we may apply an A. C. voltage of high frequency having a small amplitude (as compared with the frequency and amplitude of the saw-tooth voltage). This variable voltage will cause small rapid fluctuations of the position of the boundary point around its middle position, which will as before move comparatively slowly and linearly along the photocathode under the action of the basic saw-tooth voltage. We will obtain thus in the integral photocurrent a certain small A. C. component of high frequency, which will be proportional to the magnitude of illumination existing in the middle position of the boundary point which moves linearly along the photocathode. If we insert in the photocurrent circuit an oscillatory circuit tuned in resonance to the frequency of said fluctuations, we will obtain on this oscillatory circuit a high frequency voltage with the amplitude proportional to the illumination of one point of the picture's line, said point changing its position linearly along the picture's line; in other words, we shall obtain as in the former example (the inclusion of an inductance) a linear scanning of the picture's line. Such a system is diagrammatically shown in Fig. 4. A high frequency generator (oscillator $e$ is connected in series with the generator of the saw-tooth voltage $g$. In the circuit of the plate B is included instead of an inductance an oscillatory circuit K, which is tuned in resonance to the oscillations generated by the high frequency generator (oscillator $e$).

The high frequency voltage taken across the oscillatory circuit K may be further amplified by means of a radio-frequency amplifier and emitted directly in the space in form of radio-frequency oscillations modulated by the television signals, or it may be first detected and after the detection amplified by an audio-frequency amplifier which will in its turn modulate a radio-frequency oscillator.

The electric capacity existing between the cathode C and the anode B of the photocell may transfer a portion of the voltage generated by the saw-tooth voltage generator $g$ into the circuit of the anode B in which is inserted the inductance as shown in Fig. 2. In the system shown in Fig. 4 the magnitude of the portion of the saw-tooth voltage transferred by the capacity "cathode-anode" into the circuit of the oscillatory circuit K is unappreciable whereas the magnitude of radio-frequency voltage transferred to the same circuit from the radio-frequency oscillator $e$ is very great. In the second system (according to Fig. 4) this results in the reduction of the coefficient of modulation due to increase of the amplitude of the carrier frequency. If these oscillations are subjected to preliminary detection, said circumstance may even be advantageous since it permits to effectuate the detection with a higher efficiency in the conditions of the so-called linear ideal detector. In order to obtain this increased efficiency one may also intentionally introduce radio-frequency oscillations into the circuit of the oscillatory circuit K and make a supplementary coupling of this circuit to the radio-frequency oscillator. In the case where the radio-frequency oscillations modulated by the image signals are not subjected to detection but are emitted directly into the surrounding space, the reduction of the coefficient of modulation (depth of modulation) is detrimental. To eliminate this undesirable result one may use such a supplementary coupling of the oscillatory circuit K to the radio-frequency oscillator $e$ which should introduce into the circuit K high frequency oscillations with an amplitude equal to that of the oscillations which are transferred into the circuit due to the coupling through the capacity "cathode-anode" of the photocell, the phases of both oscillations being opposed to each other.

In the first system (according to Fig. 2) the saw-tooth voltage which is being introduced in the inductance circuit due to the capacity "cathode-anode" has always a pernicious effect. In order to eliminate this undesirable influence we may use here also a supplementary coupling between the inductance and the saw-tooth voltage generator. This coupling should introduce in the inductance circuit a saw-tooth voltage whose amplitude is equal and whose phase is opposed to the amplitude and phase of the saw-tooth voltage which is transferred into the inductance circuit due to the coupling through capacity "cathode-anode" of the photocell.

The parasitic influence of the capacity "cathode-anode" of the photocell may be brought to zero if we eliminate this capacity by screening the anode from the cathode within the photocell. This screening may be effectuated in the manner shown in Fig. 5. One of the condenser plates which in the above-described type of the photocell serves as anode, is made in the form of a grid B. The filament C which serves as the cathode of the photocell terminates before this grid without passing through same. Behind said grid is located a solid plate D. A D. C. voltage is applied as before between the plate A and the grid B, and an A. C. voltage is applied to the filament. A D. C. voltage is also applied between the grid B and the plate D. An inductance or an oscillatory circuit are connected into the circuit of the plate D which serves in this case as an anode, collecting the electrons which have passed through the grid B. The grid B screens the anode D from the cathode C of the photocell. For better screening the grid B may consist of a plurality of successive grids connected in parallel.

The last mentioned grids may be used not only for screening but also for increasing the sensitivity of the system by means of the secondary-emission multiplication. Thus, if we use a single grid we may make the anode capable of emitting secondary electrons by a suitable treatment of its surface and by applying to it a D. C. potential somewhat lower than the potential on the grid. In this case there will appear in the inductance or in the oscillatory circuit a current of opposite direction to the initial current but amplified as compared with the latter. We may also obtain a multi-stage amplification using a plurality of grids $B_1$, $B_2$ $B_3$ . . . rendered capable of secondary emission. For this purpose we must treat them in a suitable manner and apply to each consecutive grid a potential which is higher than the potential on the preceding grid (see Fig. 6). In this case the current flowing through the inductance or the oscillatory circuit inserted in the circuit of the plate D will be many times greater than the primary (initial) current.

The electron beam issuing from the grid B may also be amplified further by other methods known in technical practice of the secondary emission amplifiers such as Farnsworth's system or the like. For example it will be sufficient to place a ring between the grid B and the anode D (Fig. 5) and to use it as a means for embodying the so-called Farnsworth's multiplier.

A portion of photoelectrons striking upon the glass of the bulb knocks out secondary electrons, the magnitude of that portion of electrons being dependent upon the position of the above-mentioned boundary point on the photocathode. This may result in the distortion obtained at the image transmission, especially if the secondary emission multiplication is used. In order to eliminate this drawback we may screen the whole system by a metallic surface and apply to it such a potential with respect to the electrodes that the photoelectrons should not reach this surface.

Figure 7:
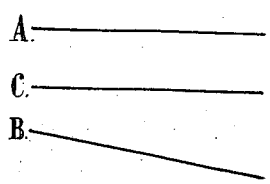

The shape and arrangement of the electrodes as described above have only been shown by way of example. In general they may be of most various forms. In particular besides the described form it may be of interest to mention the arrangement and shape of the three electrodes which form a triode tube with variable permeability (Durchgriff), wherein the cathode is represented by a photocathode, on which is projected the picture line to be scanned. For example, one of possible arrangements may consist in that one electrode has the form of a plate and lies parallel to the cylindric cathode and the other electrode has also the form of a plate which is inclined towards the cathode and disposed on the opposite side of this latter, as is shown in Fig. 7. In this manner we obtain one of the possible types of a tube with variable permeability, wherein the upper (parallel to the cathode) plate, to which a higher potential is applied may serve as anode, and the other (inclined) plate may serve as the grid (Fig. 7). To calculate the electrostatic field we can employ in this case the conception of variable permeability (Durchgriff). Assuming the permeability along the cathode to be a function $D(x)$ of the distance $x$ from the beginning of the cathode we find that the control voltage applied to the surface of the cathode must be equal to $V_u = -V_g + D(x)V_a$, where $V_g$ and $V_a$ are the grid and anode voltages with respect to cathode, the sign of the grid voltage being opposite to the sign of the anode voltage, because in the above-described system the cathode potential must be intermediate between the potentials of two other electrodes. Let us assume that the permeability is a linear function of the distance $D(x) = D_0 + D_1 x$ (it can readily be done if the grid-electrode is slightly inclined with respect to the cathode), we obtain the following expression for the coordinate of the zero line of the electrostatic field on the photocathode surface (characterized by the condition $V_u = 0$):

$$x = \frac{V_g}{D_1 V_a} - D_0$$

Assuming the grid potential to be a linear function of time $V_g = V_{g0}t + V_{g1}$ and the constant component of the grid potential to be $V_{g1} = D_0 . V_a$, we will obtain the coordinate of the zero line of the electrostatic field proportional to the time:

$$x = \frac{V_{g0}}{D_1 . V_a} t = kt$$

as in the former case.

Figure 8:
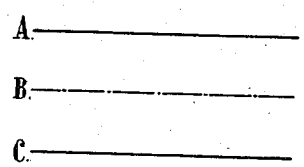

It is clear, that the same result (the travel of the zero line of the electrostatic field) may be obtained by means of an ordinary type of a tube with variable $\mu$ wherein the grid consists of a wire mesh of varying density disposed between the photocathode and the anode as is shown in Fig. 8. The calculation of the coordinate of the zero line of the electrostatic field in this tube does not differ from the preceding example.

In this tube it is possible as in the tube described with reference to Fig. 1 to fulfill the screening of the anode from the cathode and to add the secondary-emission amplification.

The herein described system of scanning the picture's line may be immediately applied for the transmission of moving pictures in a telecinema or for television transmitting by the method of "Zwischenfilm" (intermediate film). For this purpose it is sufficient to project the uniformly moving cinematic film on the photocathode of the photocell as described above through a narrow slot which is disposed at right angles to the direction of movement of the film. The period of electrical scanning mechanism which is equal to the time of scanning of one line of the image must be such that after this period the second line of the image becomes projected on the photocathode through the slot. If the photocathode is a thin filament-like structure, then we can dispense with the slot. For transmitting ordinary moving images it is necessary to use besides the electrical line scanning mechanism a supplementary mechanical frame scanning mechanism in the form of a mirror revolving drum or another moving optical system which throws the image on the slot so that one line after another is projected through this slot on the photocathode of the phototube. The period of electrical scanning mechanism which is equal to the time of scanning of one line of the image must be also in this case such that after this period there should be projected on the photocathode the following line of the image due to the mechanical frame scanning mechanism. The same mechanical scanning system may be used for transmitting the moving images according to the method of the running beam. In this case the object to be transmitted is illuminated through a running light slot and the so illuminated object is projected on the photocathode of the above-described photocell.

What I claim is:

1. In apparatus for scanning images, a phototube having a relatively thin photocathode onto which a picture line is projected, other electrodes associated with the photocathode, means supplying direct current to the electrodes and means for impressing alternating current voltage across the photocathode with respect to the electrodes so as to create an electrostatic field which has a zero value on a line lying on the photocathode surface, said line serving as a boundary line between the portion of the cathode that emits current and the portion thereof that does not emit current, means for changing the potential of the electrodes so as to move the point of zero value along the photocathode, and a complex resistance in the supply circuit of the phototube for producing a voltage which is proportional to the illumination of the moving boundary line so that a voltage proportional to the magnitude of the illumination of the image may be obtained for transmission.

2. In apparatus for scanning images, a phototube having a relatively thin light sensitive cathode onto which a picture line is projected, two plate-like electrodes spaced with respect to each other and arranged at substantial right angles with respect to the cathode, means for supplying direct current to the plate-like electrodes, means for impressing alternating current voltage across the cathode and said plate-like electrodes so as to create an electrostatic field which has a zero value on a line lying on the cathode surface, said line serving as a boundary line between the portion of the cathode that emits current and the portion thereof that does not emit current, means for altering the potential supplied to the electrodes so as to move the point of zero value along the cathode, and means arranged in the direct current supply circuit of the electrodes for producing a voltage which is proportional to the illumination of the moving boundary line so that a voltage proportional to the magnitude of the illumination of the image may be obtained for transmission.

HIRSH BROWDE.